US011304000B2

(12) United States Patent
Kinoshita et al.

(10) Patent No.: US 11,304,000 B2
(45) Date of Patent: Apr. 12, 2022

(54) NEURAL NETWORK BASED SIGNAL PROCESSING DEVICE, NEURAL NETWORK BASED SIGNAL PROCESSING METHOD, AND SIGNAL PROCESSING PROGRAM (71) Applicant: NIPPON TELEGRAPH AND TELEPHONE CORPORATION, Tokyo (JP)

(72) Inventors: Keisuke Kinoshita, Kyoto (JP); Tomohiro Nakatani, Kyoto (JP); Marc Delcroix, Kyoto (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 205 days.

(21) Appl. No.: 16/636,031

(22) PCT Filed: Aug. 1, 2018

(86) PCT No.: PCT/JP2018/028910
§ 371 (c)(1),
(2) Date: Feb. 3, 2020

(87) PCT Pub. No.: WO2019/026973
PCT Pub. Date: Feb. 7, 2019

(65) Prior Publication Data
US 2021/0400383 A1 Dec. 23, 2021

(30) Foreign Application Priority Data
Aug. 4, 2017 (JP) .............................. JP2017-151289

(51) Int. Cl.
H03G 5/00 (2006.01)
H04R 3/04 (2006.01)
(Continued)

(52) U.S. Cl.
CPC ................. *H04R 3/04* (2013.01); *G06N 3/08* (2013.01); *G10L 21/0224* (2013.01); *G10L 25/30* (2013.01); *G10L 2021/02082* (2013.01)

(58) Field of Classification Search
CPC ....................................................... H03G 5/00
See application file for complete search history.

(56) References Cited

U.S. PATENT DOCUMENTS 9,813,810 B1 * 11/2017 Nongpiur ............. G06N 3/0454
10,667,069 B2 * 5/2020 Wang ...................... G10L 25/21
(Continued)

OTHER PUBLICATIONS

International Search Report and Written Opinion dated Oct. 2, 2018 for PCT/JP2018/028910 filed on Aug. 1, 2018, 7 pages including English Translation of the International Search Report.
(Continued)

*Primary Examiner* — Olisa Anwah
(74) *Attorney, Agent, or Firm* — Xsensus LLP (57) ABSTRACT A signal processing device includes a power estimating unit that treats the feature quantity of a signal including reverberation as the input; inputs an observation feature quantity corresponding to an observation signal to a neural network which is learnt in such a way that the estimate value of the feature quantity corresponding to the power of the signal having reduced reverberation, from among the input signal, is output; and estimates the estimate value of the feature quantity corresponding to the power of the signal having reduced reverberation and corresponding to the observation signal. Moreover, the signal processing device includes a regression coefficient estimating unit that uses the estimate value of the feature quantity corresponding to the power as obtained as the estimation result by the power estimating unit, and estimates a regression coefficient of the autoregressive process for generating the observation signal.

10 Claims, 6 Drawing Sheets (51) Int. Cl.
    G10L 21/0224    (2013.01)
    G06N 3/08       (2006.01)
    G10L 25/30      (2013.01)
    G10L 21/0208    (2013.01)

(56) References Cited

U.S. PATENT DOCUMENTS

| | | | | |
|---|---|---|---|---|
| 2004/0213415 A1* | 10/2004 | Rama | ............... | H04R 25/554 |
| | | | | 381/63 |
| 2008/0037804 A1* | 2/2008 | Shmunk | ............... | H04R 3/04 |
| | | | | 381/96 |
| 2016/0093313 A1* | 3/2016 | Vickers | ............... | G10L 25/60 |
| | | | | 704/232 |
| 2017/0353789 A1* | 12/2017 | Kim | ............... | H04R 3/005 |

OTHER PUBLICATIONS

Ishii, T., et al., "Reverberant Speech Recognition Based on Denoising Autoencoder," INTERSPEECH 2013, Lyon, France, Aug. 25-29, 2013, pp. 3512-3516.

Kinoshita, K., et al., "Neural network-based spectrum estimation for online WPE dereverberation," INTERSPEECH 2017, Stockholm, Sweden, Aug. 20-24, 2017, pp. 384-388.

Nakatani, T., et al., "Speech Dereverberation Based on Variance-Normalized Delayed Linear Prediction," IEEE Transactions On Audio, Speech, and Language Processing, vol. 18, No. 7, Sep. 2010, pp. 1717-1731.

Yoshioka, T., and Nakatani, T., "Generalization of Multi-Channel Linear Prediction Methods for Blind MIMO Impulse Response Shortening," IEEE Transactions On Audio, Speech, and Language Processing, vol. 20, No. 10, Dec. 2012, pp. 2707-2720.

* cited by examiner

NEURAL NETWORK BASED SIGNAL PROCESSING DEVICE, NEURAL NETWORK BASED SIGNAL PROCESSING METHOD, AND SIGNAL PROCESSING PROGRAM

CROSS-REFERENCE TO RELATED APPLICATIONS

The present application is based on PCT filing PCT/JP2018/028910, filed Aug. 1, 2018, which claims priority to JP 2017-151289, filed Aug. 4, 2017, the entire contents of each are incorporated herein by reference.

FIELD

The present invention relates to a neural network based signal processing device, a neural network based signal processing method, and a signal processing program.

BACKGROUND

When sounds in the actual environment are recorded using microphones; generally, it is not only the targeted audio signals that are observed but the signals obtained as a result of superimposition of various acoustic distortions (noise or reverberation) on the targeted sounds are also observed. Such noise and reverberation are the factors for causing a significant decline in the clarity of the targeted sound and the degree of ease in understanding the targeted sound. Moreover, it is also known that, if such acoustic distortions are present in the recorded sounds, then the sound recognition accuracy undergoes a significant decline.

In that regard, a technology is known that enables removal of the acoustic distortions from the observation audio signals. The technology for removing the acoustic distortions from the observation audio signals can be implemented as an elemental technology of various acoustic signal processing systems. For example, the technology for removing the acoustic distortions from the observation audio signals can be implemented in a hearing aid system or a sound editing system in which the ease in understanding is enhanced by extracting the targeted signals from the sounds recorded in the actual environment. Moreover, the technology for removing the acoustic distortions from the observation audio signals can also be implemented in a sound recognition system that enables accurate recognition of the sounds recorded in the actual environment.

In recent years, a method has been proposed in which, regarding the clean sound included in the observation signals, the Gaussian distribution having an average of 0 and a dispersion $\lambda(n, k)$ (where n represents the frame index and k represents the frequency index) is assumed; the generation process of the observation signals is assumed to follow the autoregressive process; and the regression coefficient of the autoregressive process is estimated in a repeated manner so as to estimate an inverse filter meant for reverberation removal (for example, refer to Non Patent Literature 1).

CITATION LIST

Patent Literature

Non Patent Literature 1: T. Nakatani, T. Yoshioka, K. Kinoshita, M. Miyoshi and B.-H. Juang, "Speech Dereverberation Based on Variance-Normalized Delayed Linear Prediction", IEEE Transactions on Audio, Speech, and Language Processing, vol. 18 (7), pp. 1717-1731, 2010.

SUMMARY

Technical Problem

Figure 6:
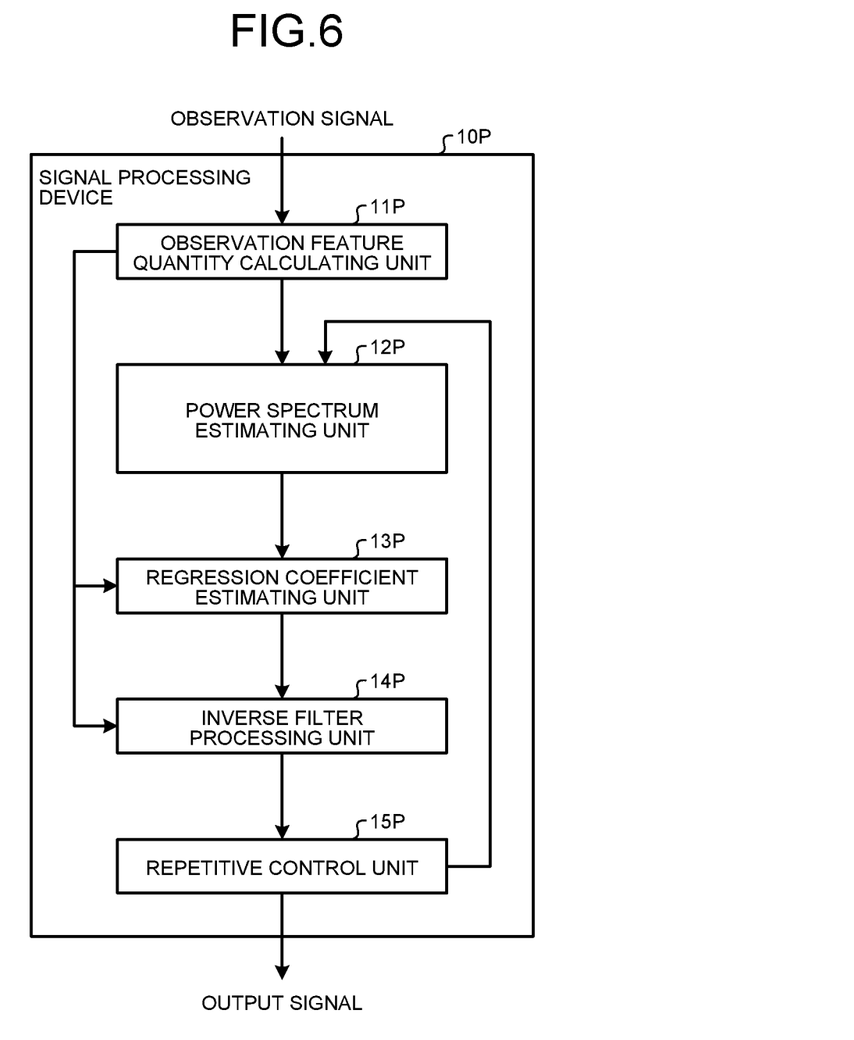
FIG. 6 is a diagram illustrating an exemplary configuration of a conventional signal processing device.

The following explanation is given about a conventional signal processing device. FIG. 6 is a diagram illustrating an exemplary configuration of a conventional signal processing device. As illustrated in FIG. 6, a conventional signal processing device 10P includes an observation feature quantity calculating unit 11P, a power spectrum estimating unit 12P, a regression coefficient estimating unit 13P, an inverse filter processing unit 14P, and a repetitive control unit 15P.

The observation feature quantity calculating unit 11P calculates an observation-signal feature quantity from the observation signals that are input. The power spectrum estimating unit 12P calculates the power spectrum of the desired signal either by receiving, before the repetitive calculation is performed, input of the observation feature quantity obtained by conversion by the observation feature quantity calculating unit 11P or by receiving, after getting into a repetitive loop, input of the processing result obtained by the inverse filter processing unit 14P. The regression coefficient estimating unit 13P estimates the regression coefficient using the estimation result about the power spectrum of the desired signal. The inverse filter processing unit 14P performs inverse filter processing using the estimated regression coefficient.

If the repetitive calculation is not yet finished, then the repetitive control unit 15P again inputs, to the power spectrum estimating unit 12P, the result of inverse filter processing performed by the inverse filter processing unit 14P. Thereafter, the following operations are repeatedly performed for the required number of times: re-estimation of the power spectrum of the desired signal; and regression coefficient estimation and inverse filter processing based on the re-estimation.

However, in the conventional signal processing device 10P, reverberation removal is performed by substituting the power spectrum of the observation signals for the initial value of the dispersion value of the audio signals that include the direct sound and the initial reflected sound. Hence, if the observation signals become shorter, the accuracy undergoes a decline.

The present invention has been made in view of the issues mentioned above, and it is an object of the present invention to provide a neural network based signal processing device, a neural network based signal processing method, and a signal processing program that enable accurate reverberation removal even when the observation signals are short.

Solution to Problem

A neural network based signal processing device that, from observation signal which is measured with one or more microphones and which includes reverberation, estimates signal having reduced reverberation, the signal processing device includes: a first estimating unit that treats feature quantity of signal including everberation as input, inputs observation feature quantity corresponding to the observation signal to a neural network which is learnt in such a way that estimate value of feature quantity corresponding to power of signal having reduced reverberation, from among the input signal, is output, and estimates estimate value of feature quantity corresponding to power of the signal having reduced reverberation and corresponding to the observation signal; and a second estimating unit that uses estimate value of feature quantity corresponding to power as obtained as estimation result by the first estimating unit, and estimates regression coefficient of autoregressive process for generating the observation signal.

Advantageous Effects of Invention

According to the present invention, reverberation removal can be performed with accuracy even when the observation signals are short.

DESCRIPTION OF EMBODIMENTS

An exemplary embodiment of the present invention is described below in detail with reference to the accompanying drawings. However, the present invention is not limited by the embodiment described below. Moreover, in the drawings, identical constituent elements are referred to by the same reference numerals.

Embodiment

Given below is the description of the embodiment of a neural network based signal processing device, a neural network based signal processing method, and a signal processing program disclosed in the application concerned. The embodiment described below is only exemplary, and the technology disclosed in the application concerned is not limited by the embodiment. Moreover, the embodiment described below can be appropriately combined with other embodiments without causing any contradiction.

[Signal Processing Device According to Embodiment]

Firstly, the explanation is given about a configuration of a signal processing device according to the present embodiment. The signal processing device according to the present embodiment uses a neural network that enables performing spectrum estimation with accuracy, and performs an estimation operation for estimating the feature quantity corresponding to the power of the desired signal.

Figure 1:
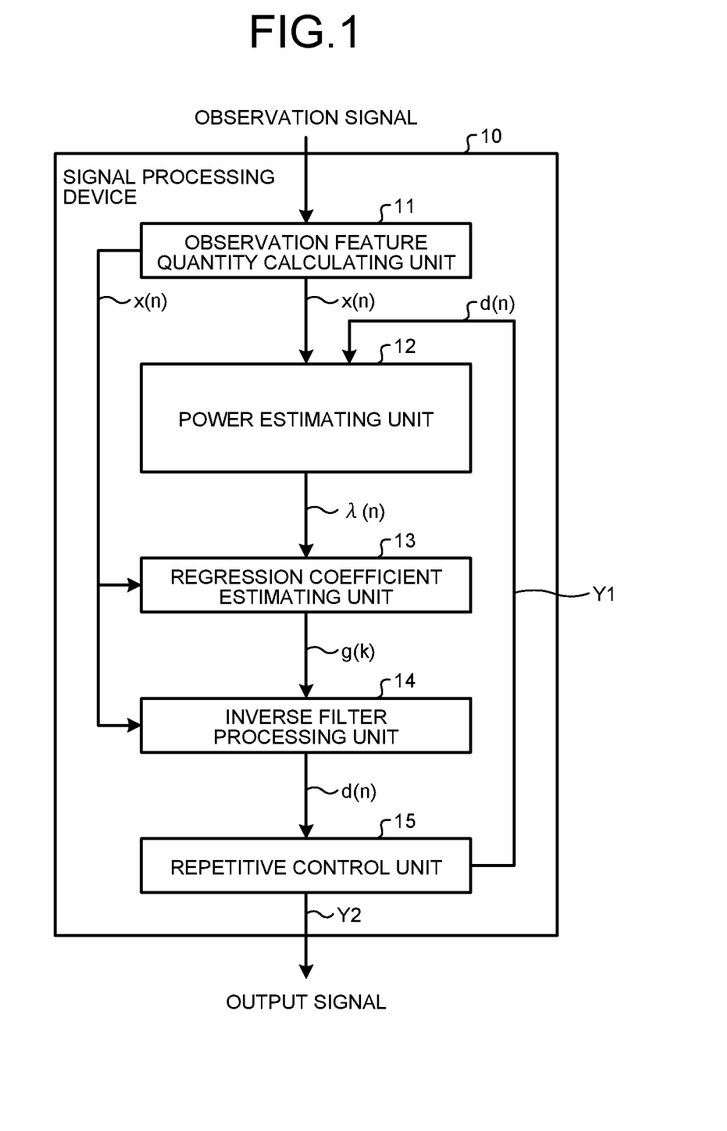
FIG. 1 is a diagram for explaining an exemplary functional configuration of a signal processing device according to an embodiment.

FIG. 1 is a diagram for explaining an exemplary functional configuration of the signal processing device according to the embodiment. As illustrated in FIG. 1, a signal processing device 10 according to the embodiment includes an observation feature quantity calculating unit 11, a power estimating unit 12 (a first estimating unit), a regression coefficient estimating unit 13 (a second estimating unit), an inverse filter processing unit 14, and a repetitive control unit 15. The signal processing device 10 is implemented when, for example, a computer including a ROM (Read Only Memory), a RAM (Random Access Memory), and a CPU (Central Processing Unit) reads a predetermined computer program, and then the CPU executes the predetermined computer program.

The observation feature quantity calculating unit 11 converts the observation signals, which represent input signals, into an observation feature quantity. More particularly, the observation feature quantity calculating unit 11 converts the observation signals, which are observed using one or more microphones and which include reverberation, into an observation feature quantity. The observation feature quantity calculating unit 11 receives input of the signals of the time domain, calculates the observation feature quantity from the input signals, and outputs it. The observation feature quantity calculating unit 11 outputs the observation feature quantity to the power estimating unit 12, the regression coefficient estimating unit 13, and the inverse filter processing unit 14. In the present embodiment, $x_m(t)$ represents the generic term for the observation signals, and $x(n)$ represents the generic term for the observation feature quantity. Moreover, t represents a time index, m represents a microphone index, and n represents a short-period time frame index. Herein, it is assumed that the observation signals include the voices of one or more speakers and acoustic distortion (noise and reverberation) other than the voices.

Based on the observation feature quantity, the power estimating unit 12 estimates the feature quantity corresponding to the power of the desired signal at each timing using an learned neural network. Herein, based on one or more observation feature quantities obtained by the observation feature quantity calculating unit 11, the power estimating unit 12 calculates the feature quantity corresponding to the power of the desired signal, from which the reverberation is suppressed, using an learned neural network. Herein, the feature quantity corresponding to the power is, for example, the power spectrum, or the average value of the frame-by-frame power of the observation feature quantity of the time area.

That is, using an learned neural network, based on the observation feature quantity $x(n)$, the power estimating unit 12 estimates the feature quantity (for example, the power spectrum) corresponding to the power of the sound that corresponds to the observation feature quantity $x(n)$ and that includes the direct sound and the initial reflected sound, that is, estimates the feature quantity corresponding to the power of the desired signal. Alternatively, using an learned neural network, the power estimating unit 12 estimates a special correlation matrix (for details, refer to chapter 5 of Reference Literature 1) in which the inter-microphone correlation of the sound, which includes the direct sound and the initial reflected sound, is also taken into account. Apart from that, a series made of the average values of the power of the observation feature quantity of the time area in a predetermined temporal interval can also be used as the feature quantity corresponding to the power.

Herein, although the explanation is given under the assumption that the desired signal is the signal of the sound including the direct sound and the initial reflected sound, that is not the only possible case. In essence, a signal in which the reverberation is suppressed more than the observation signal can be considered as the desired signal.

In the present embodiment, the explanation is given about the case in which the power spectrum is used as the feature quantity corresponding to the power, and $\lambda(n)$ represents the generic term for the power spectrum of the desired signal. Moreover, F[·] represents the neural network.

For example, the power estimating unit 12 uses a Long Short-Term Memory (LSTM) recurrent neural network. Of course, the neural network used by the power estimating unit 12 can be of any other form such as a totally-coupled neural network, a recurrent neural network, or a bidirectional recurrent neural network.

The regression coefficient estimating unit 13 estimates a linear prediction filter using the estimate value of the feature quantity corresponding to the power of the desired signal. The regression coefficient estimating unit 13 estimates the linear prediction filter using the power spectrum λ(n) of the desired signal. More particularly, using the power spectrum of the desired signal, the regression coefficient estimating unit 13 estimates the linear prediction filter in such a way that the prediction residual follows the time-varying Gaussian distribution having the average of 0 and having the dispersion to be the power spectrum of the desired signal. The filter coefficient of the linear prediction filter represents the "regression coefficient". More particularly, the regression coefficient estimating unit 13 estimates the regression coefficient based on the estimated power spectrum λ(n) of the desired signal and the observation feature quantity x(n). In the present embodiment, g(k) represents the generic term for the regression coefficient (for the details related to the regression coefficient estimating unit, refer to Reference Literature 1 (T. Yoshioka, T. Nakatani, "Generalization of Multi-Channel Linear Prediction Methods for Blind MIMO Impulse Response Shortening", IEEE Transactions on Audio, Speech, and Language Processing, vol. 20 (10), pp. 2707-2720, 2012.))

The inverse filter processing unit 14 performs inverse filter processing using the linear prediction filter estimated by the regression coefficient estimating unit 13. The inverse filter processing unit 14 performs inverse filter processing with respect to the observation feature quantity using the regression coefficient g(k) and the observation feature quantity x(n); and obtains a reverberation removal signal d. In the present embodiment, d(n) represents the generic term for the reverberation removal signal d.

The repetitive control unit 15 performs control by which the following operations are repeatedly performed depending on a predetermined end condition: the operation performed by the power estimating unit 12 for estimating the power of the desired signal; the operation performed by the regression coefficient estimating unit 13 for estimating the linear prediction filter; and the inverse filter processing performed by the inverse filter processing unit 14. That is, the repetitive control unit 15 performs control for repeatedly performing the following operations for the number of times required to satisfy a predetermined end condition: the operation performed by the power estimating unit 12 for calculating the power spectrum of the desired signal; the operation performed by the regression coefficient estimating unit 13 for calculating the linear prediction filter using the feature quantity corresponding to the power of the desired signal; and the inverse filter processing performed by the inverse filter processing unit 14 with respect to the observation feature quantity. The number of times required to satisfy the predetermined end condition is, for example, either the predetermined number of times set in advance or the number of times required till at least one of the used parameters reaches a predetermined threshold value.

If the predetermined end condition is not yet achieved or if the repeat count is still smaller than a predetermined count, the repetitive control unit 15 again inputs the result of inverse filter processing as obtained by the inverse filter processing unit 14 (i.e., again inputs the reverberation removal signal d(n)) to the power estimating unit 12.

That is, in a repetitive loop, as a result of the control performed by the repetitive control unit 15, the power estimating unit 12 receives input of the reverberation removal signal d(n); and, using the learned neural network F[·], estimates the estimate value (for example, the power spectrum λ(n)) of the feature quantity corresponding to the power of the desired signal that corresponds to the reverberation removal signal d(n). Then, based on the power spectrum λ(n) of the desired signal corresponding to the reverberation removal signal d(n) and based on the observation feature quantity x(n), the regression coefficient estimating unit 13 estimates the regression coefficient g(k). Subsequently, the inverse filter processing unit 14 performs inverse filter processing using the regression coefficient g(k) estimated by the regression coefficient estimating unit 13, and newly outputs the reverberation removal signal d(n).

When the predetermined end condition is satisfied or when the repeat count reaches the predetermined count, the repetitive control unit 15 outputs the result of inverse filter processing, which is performed by the inverse filter processing unit 14, as the reverberation removal signal d(n). In this way, in the present embodiment, the repetitive control unit 15 forces re-estimation of the feature quantity corresponding to the power of the desired signal and accordingly performs control for repeatedly performing regression coefficient estimation and inverse filter processing.

[Mathematical Background in Present Embodiment]

Firstly, the explanation is given about the mathematical background in the present embodiment. In the signal processing method according to the present embodiment, regarding the clean sound included in the observation signals, the Gaussian distribution having the average of 0 and the dispersion λ(n, k) (where n represents the frame index and k represents the frequency index) is assumed; the generation process of the observation signals is assumed to follow the autoregressive process; and the regression coefficient of the autoregressive process is repeatedly estimated for estimating an inverse filter meant for reverberation removal.

To start with, the explanation is given for the case in which the observation signal $x_m(t)$ represents the input signal. The observation signal $x_m(t)$ is converted into an observation feature quantity $x_m(n, k)$ by the observation feature quantity calculating unit 11. As given below in Equation (1), the observation feature quantity $x_m(n, k)$ is assumed to be expressed as the convolution of a clean audio signal s(n, k) and an impulse response $h_m(l, k)$ between the sound source and the m-th microphone.

$$x_m(n, k) = \sum_{l=0}^{L-1} h_m^*(l, k) s(n-l, k) \quad (1)$$

In Equation (1), "*" represents the complex conjugate of variables. As given below in Equation (2), the observation process can be equivalently expressed as the autoregressive process in which the optimum regression coefficient $g_m(l, k)$ is used.

$$x_1(n, k) = d(n, k) + \sum_{m=1}^{M} \sum_{l=D}^{D+L-1} g_m^*(l, k) x_m(n-l, k) \quad (2)$$

In Equation (2), the second term represents the posterior reverberation portion in the observation signal; and the first term is expressed as the remaining portion, that is, as the signal including the direct sound and the initial reflected sound. Meanwhile, Equation (2) can be expressed in the matrix format as given below in Equation (3). In the equations given hereinafter, bold lowercase alphabets (for example, bold "g" and "x" in Equation (3)) represent matrices. Moreover, H represents the conjugate transpose, and T represents the transposition. The variables in Equation (3) are expressed using Equations (4) to (7) given below.

$$x_m(n,k) = d_m(n,k) + g(k)^H x(n-D,k) \quad (3)$$

$$x_m(n,k) = [x_m(n,k), \ldots, x_m(n-L+1,k)]^T \quad (4)$$

$$x(n,k) = [(x_1(n,k))^T, \ldots, (x_M(n,k))^T]^T \quad (5)$$

$$g_m(k) = [g_m(D,k), \ldots, g_m(D+L-1,k)]^T \quad (6)$$

$$g(n) = [(g_1(k))^T, \ldots, (g_M(k))^T]^T \quad (7)$$

If the optimum regression coefficient can be obtained, then Equation (3) implies that reverberation removal can be performed as given below in Equation (8), and the signal including the direct sound and the initial reflected sound can be retrieved.

$$\hat{d}(n,k) = x_1(n,k) - \hat{g}(k)^H x(n-D,k) \quad (8)$$

Then, as given below in Equation (9), it is assumed that the reverberation removal signal d(n, k) follows the Gaussian distribution having the average of 0 and the dispersion λ(n, k).

$$\mathcal{N}_C(d(n,k); 0, \lambda(n,k)) = \frac{1}{\pi \lambda(n,k)} e^{-\frac{|d(n,k)|^2}{\lambda(n,k)}} \quad (9)$$

Using this probability model, for each frequency k, a likelihood function can be defined as given below in Equations (10) and (11) regarding the observation at counts 1 to N.

$$\mathcal{L}(g(k), \lambda(k)) = \prod_{n=1}^{N} \mathcal{N}_C(d(n,k); 0, \lambda(n,k)) \quad (10)$$

$$\lambda(k) = [\lambda(1,k), \ldots, \lambda(N,k)]^T \quad (11)$$

Lastly, in order to minimize Equation (12) given below, optimum g(k) and optimum λ(k) that maximize the likelihood function are obtained.

$$\underset{\lambda(k)>0, g(k)}{\text{minimize}} \sum_{n=1}^{N} \frac{|d(n,k)|^2}{\lambda(n,k)} + \log \pi \lambda(n,k) \quad (12)$$

As a specific sequence of calculations, the regression coefficient estimating unit 13 performs arithmetic processing A in which Equations (13) to (15) given below are used, and obtains the regression coefficient g(k). Then, the inverse filter processing unit 14 performs arithmetic processing B in which Equation (4) given earlier is used, and obtains the reverberation removal signal d(n, k). Herein, R represents a weighted covariance matrix, and r represents a weighted correlation vector.

$$\hat{g}(k) = R^{-1} r \quad (13)$$

$$R = \sum_{n=D}^{N} \frac{x(n-D,k) x^H(n-D,k)}{\lambda(n,k)} \quad (14)$$

$$r = \sum_{n=D}^{N} \frac{x(n-D,k) x^*(n)}{\lambda(n,k)} \quad (15)$$

In the present embodiment, the power spectrum (λ(n, k)) of the desired signal that should be applied in Equations (14) and (15) is estimated by the power estimating unit 12 using the learned neural network F[·].

With reference to Equations (16) to (18) given below, a brief overview is given about the input-output relationship of the neural network F[·] used by the power estimating unit 12. The observation feature quantity x(n) of the sound including reverberation represents the input of the neural network F[·]. Moreover, the power spectrum of the sound including the direct sound and the initial reflected sound, that is, the power spectrum λ(n) of the desired signal represents the output of the neural network F[·].

$$\lambda(n) = \mathcal{F}[x(n)] \quad (16)$$

$$\lambda(n) = [\lambda(n,1), \ldots, \lambda(n,K)] \quad (17)$$

$$x(n) = [x(n,1), \ldots, x(n,K)] \quad (18)$$

In the present embodiment, the power estimating unit 12 treats the observation feature quantity x(n) as the input; and inputs the power spectrum λ(n) of the desired signal, which is given above in Equations (16) to (18) and which is output from the neural network F[·], to the regression coefficient estimating unit 13. Alternatively, at the time of the processing of the iterative loop, the power estimating unit 12 treats the reverberation removal signal d(n), which is the result obtained by the inverse filter processing unit 14, as the input; and inputs the power spectrum λ(n) of the desired signal as the output from the neural network F[·], which is expressed above in Equations (16) to (18), to the regression coefficient estimating unit 13.

The regression coefficient estimating unit 13 substitutes, in Equations (14) and (15), the power spectrum λ(n) of the desired signal as output from the neural network F[·], and estimates the regression coefficient g(k) using Equation (3). Then, in the present embodiment, using the estimated regression coefficient g(k), the inverse filter processing unit 14 applies Equation (4) and performs reverberation removal according to a linear inverse filter, and obtains the reverberation removal signal d(n, k).

Thus, the optimum regression coefficient g(k) and the optimum reverberation removal signal d(n, k) can be obtained as a result of repeatedly performing the following operations: estimation of the power spectrum of the desired signal of the neural network F[·] expressed above in Equations (16) to (18); the arithmetic processing A in which the regression coefficient g(k) is estimated using Equations (13) to (15); and the arithmetic processing B in which the reverberation removal signal d(n, k) is obtained using Equation (4).

In this way, in the present embodiment, as a result of estimating the feature quantity (for example, the power spectrum) corresponding to the power of the desired signal using a neural network, it becomes possible to perform power spectrum estimation with high accuracy. Thus, in the present embodiment, when the observation signal length is short, that is, when the value of N is small, it becomes possible to calculate the weighted covariance matrix R and the weighted correlation vector r that are close to the ideal values using Equations (14) and (15).

Generally, it is known that the sound recognition performance cannot be improved even if the reverberation-removed sound output from the neural network F[·] is used. In contrast, in the embodiment, reverberation removal is performed using the neural network F[·]; and then an inverse filter is accordingly designed and reverberation removal is performed also using the inverse filter. In this way, in the present embodiment, a linear inverse filter is estimated based on the output obtained from the neural network F[·], and then linear reverberation removal is performed, thereby resulting in improvement in the sound recognition performance.

[Reverberation Removal Operation]

The signal processing device 10 removes reverberation from the observation signals, which are input, with a high degree of accuracy; cleans the target sounds for recording included in the observation signals; and outputs those sounds. Explained below with reference to FIG. 1 is a flow of the reverberation removal operation (a test operation) performed in the signal processing device 10.

Firstly, in the test operation, when a signal of the time area (i.e., the observation signal) is input, the observation feature quantity is calculated as given earlier in Equation (1) and is then output. For example, the observation feature quantity calculating unit 11 divides the input signal of the time area into short time frames of about 30 ms, performs short-period Fourier transform with respect to the data of each short time frame, and outputs a complex spectrum x(n, k).

Then, the power estimating unit 12 treats the observation feature quantity, which is calculated by the observation feature quantity calculating unit 11, as the input; and, using the learned neural network F[·] expressed in Equations (16) to (18), estimates the feature quantity (for example, the power spectrum $\lambda(n)$) corresponding to the power of the signal obtained by reducing the reverberations from the observation signal (for example, corresponding to the power of the audio signal including the direct sound and the initial reflected sound). When the complex spectrum x(n, k) represents the input of the neural network; for example, in the input layer of the neural network, an operation of taking the square of the absolute value of the input value and converting it into a real value is explicitly included. As a result, even if the input of the neural network is a complex number, the power estimating unit 12 can output the feature quantity as a real value corresponding to the power.

Subsequently, the feature quantity corresponding to the power (for example, the power spectrum $\lambda(n)$) as output from the power estimating unit 12 is input to the regression coefficient estimating unit 13. Then, the regression coefficient estimating unit 13 substitutes the power spectrum $\lambda(n)$ in Equations (14) and (15); estimates the regression coefficient g(k) using Equation (13); and outputs the regression coefficient g(k).

The inverse filter processing unit 14 treats the regression coefficient g(k) as the input; performs reverberation removal according to a linear inverse filter using Equation (4); and outputs the reverberation removal signal d(n, k).

Subsequently, if the predetermined end condition is not satisfied or if the repeat count is smaller than the predetermined count, the repetitive control unit 15 inputs the reverberation removal signal d(n, k) to the power estimating unit 12, and improves the estimation accuracy of the feature quantity corresponding to the power of the desired signal.

Then, the regression coefficient estimation operation by the regression coefficient estimating unit 13 and the inverse filter processing by the inverse filter processing unit 14 are again carried out using the improved feature quantity corresponding to the power of the desired signal. That is, the operations equivalent to the repetitive loop illustrated by an arrow Y1 in FIG. 1 are performed in a repeated manner.

When the predetermined end condition is satisfied or when the repeat count reaches the predetermined count, the repetitive control unit 15 considers that reverberation removal has been performed to a sufficient level and outputs the reverberation removal signal d(n, k) as illustrated by an arrow Y2 in FIG. 1.

[Learning Operation for Learning Neural Network]

In the signal processing device 10, during advance learning performed before the test, the parameters of the neural network F[·] are optimized using the pair of the feature quantity of the sound including reverberation and the feature quantity (the correct signal) of the corresponding sound including the direct sound and the initial reflected sound. Herein, the learning is performed using learning data that is prepared in advance from a set of pairs of the observation signal for learning (the sound including reverberation) and the corresponding sound (the correct signal) including the direct sound and the initial reflected sound.

Figure 2:
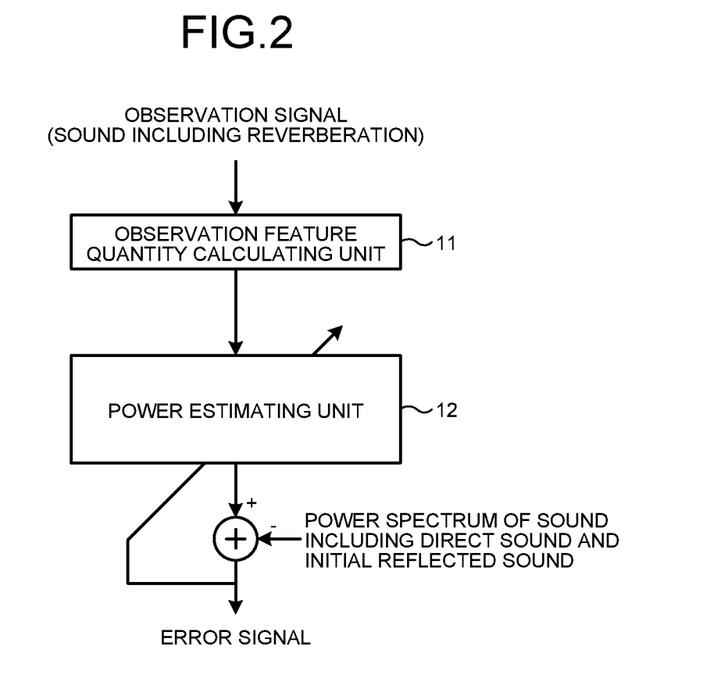
FIG. 2 is a diagram illustrating a configuration of the main parts of the signal processing device illustrated in FIG. 1.

Given below is the explanation of a flow of the learning operation performed in the signal processing device 10. FIG. 2 is a diagram illustrating a configuration of the main parts of the signal processing device 10 illustrated in FIG. 1. For the purpose of illustration, only the main parts of the signal processing device 10 are illustrated in FIG. 2.

As illustrated in FIG. 2, the power estimating unit 12 receives input of the observation feature quantity calculated by the observation feature quantity calculating unit 11 with respect to the observation signal for learning (i.e., the sound including reverberation) in the learning data. The sound including reverberation implies, for example, the sound including the clean sound and reverberation.

Moreover, a teacher signal that is meant for comparison with the output of the neural network in the power estimating unit 12 represents the feature quantity corresponding to the power of the signal obtained by reducing the reverberation from the input observation signal including the reverberation. For example, the teacher signal represents the power spectrum data of the sound including the direct sound and the initial reflected sound corresponding to the input sound including the reverberation. The learning data is provided in advance as the correct signal in the learning data.

During the learning, the observation feature quantity of the sound including the reverberation as obtained from the observation signal for learning is input to the neural network in the power estimating unit 12, and the output is obtained. Then, the parameters of the neural network are updated so that the square error between the output and the teacher signal (the correct signal in the learning data) is minimized. In essence, the parameters of the neural network can be updated so that the output of the neural network and the correct signal become closer; and a distance other than the square error can be used as the reference.

More particularly, when s represents the teacher signal, when F[·; θ] represents the neural network, when θ represents a parameter of the neural network, and when x represents the input of the neural network; the parameter θ is updated during the learning in such a way that the value $|s-F[x;\theta]|^2$ becomes the smallest.

Figure 3:
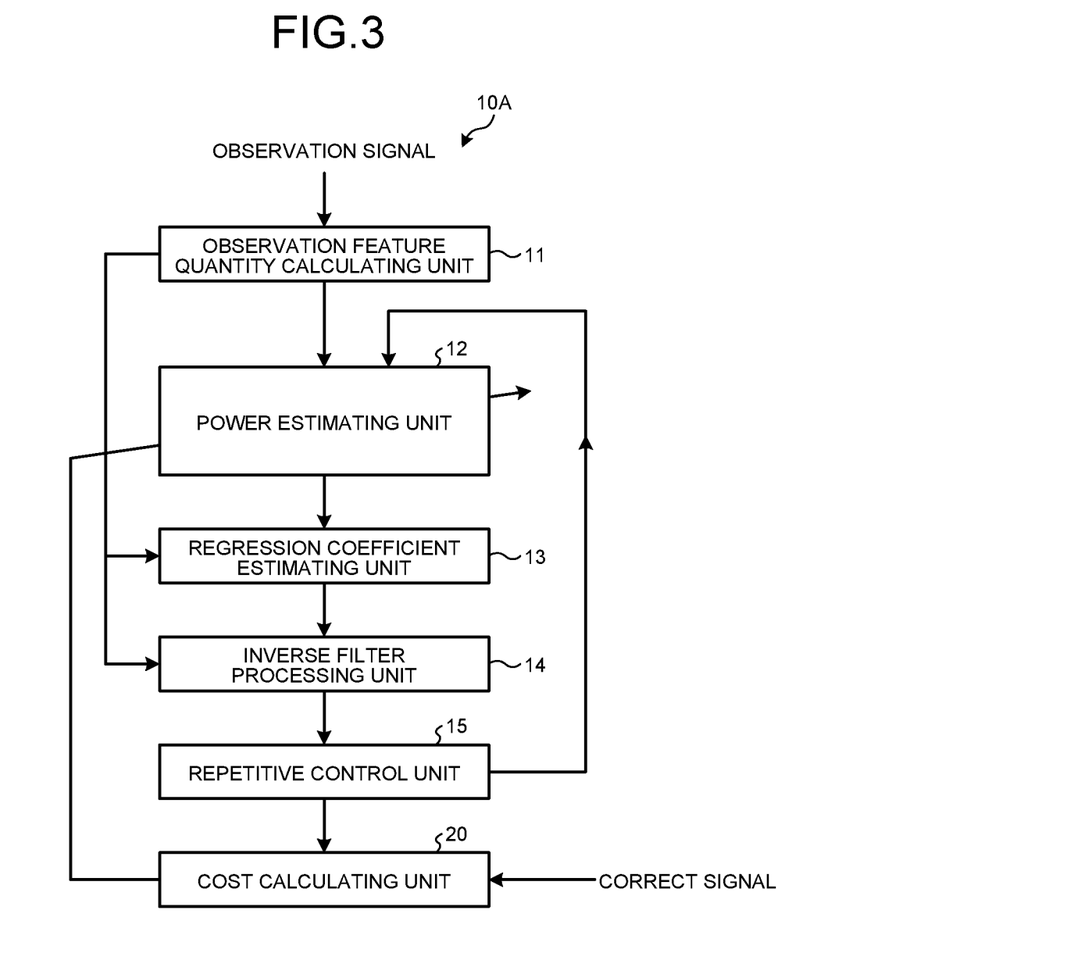
FIG. 3 is a diagram illustrating an exemplary functional configuration of a signal processing device according to the embodiment.

FIG. 3 is a diagram illustrating an exemplary functional configuration of a signal processing device according to the embodiment. A signal processing device 10A illustrated in FIG. 3 further includes a cost calculating unit 20 that calculates the cost representing a neural network optimization criterion.

In the signal processing device 10A illustrated in FIG. 3, the output from the neural network is sent to the regression coefficient estimating unit 13, which then calculates the regression coefficient. Subsequently, in the signal processing device 10A, the inverse filter processing unit 14 performs inverse filter processing with respect to the observation feature quantity based on the regression coefficient, and the result of inverse filter calculation is input to the cost calculating unit 20.

Based on the signal obtained after the inverse filter processing and based on the correct signal provided as the learning data, the cost calculating unit 20 calculates the cost of the neural network optimization criterion.

Then, in the signal processing device 10A, the parameter of the neural network is updated according to the error back propagation algorithm in such a way that the cost decreases as compared to the cost before the updating of the parameter.

With reference to FIG. 2, the correct signal represents the correct solution of the output value of the power estimating unit. However, in this example, the correct signal differs according to the eventual objective (i.e., what is to be calculated using the output of the power estimating unit). A few examples of the cost calculated by the cost calculating unit 20 and the correct signal are given below.

For example, it is assumed that the cost calculating unit 20 is a sound recognition system expressible using a neural network, and that the correct signal represents a phoneme label.

In that case, the power estimating unit 12 is learnt (i.e., updated) in such a way that the phoneme label estimated in the cost calculating unit 20 (i.e., the sound recognition system) approaches the correct phoneme label.

Moreover, it is assumed that the cost calculating unit 20 is a noise suppression system expressible using a neural network, and that the correct signal represents the feature quantity of the clean audio signal not including noise and reverberation.

In that case, the power estimating unit 12 is learnt (i.e., updated) in such a way that the result of noise suppression approaches the features of the clean audio signal, which is the correct signal, as much as possible.

With such a configuration, the parameters of the neural network can be learnt in such a way that a more appropriate power spectrum estimate value can be output according to the eventual objective.

[Sequence of Operations in Reverberation Removal Operation]

Figure 4:
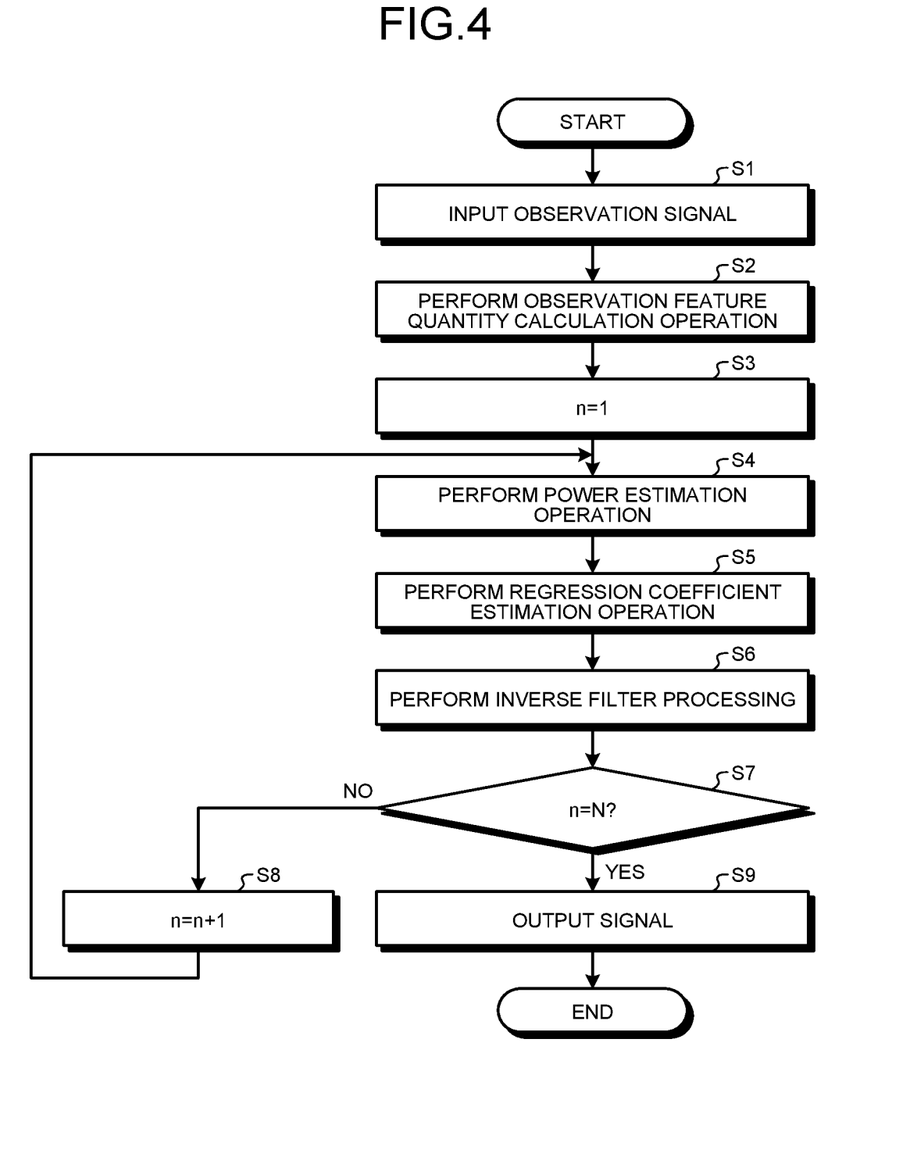
FIG. 4 is a flowchart for explaining the sequence of operations during a reverberation removal operation performed according to the embodiment.

Given below is the explanation of a sequence of operations during the reverberation removal operation performed in the signal processing device 10. FIG. 4 is a flowchart for explaining the sequence of operations during the reverberation removal operation performed according to the embodiment. The following explanation is given about the concrete operations performed when "reaching the predetermined repeat count" represents the predetermined end condition.

With reference to FIG. 4, firstly, when an observation signal is input (Step S1), the observation feature quantity calculating unit 11 performs the observation feature quantity calculation operation for calculating the observation feature quantity of the observation signal as given earlier in Equation (1) (Step S2).

Then, the repetitive control unit 15 initializes a repeat count n to "1" (Step S3). Subsequently, the power estimating unit 12 treats the observation feature quantity as the input and performs the power estimation operation for estimating the power spectrum $\lambda(n)$ of the desired signal that is output from the learned neural network $F[\cdot]$ expressed in Equations (16) to (18) (Step S4).

Then, using the power spectrum $\lambda(n)$ of the desired signal, the regression coefficient estimating unit 13 performs the regression coefficient estimation operation for estimating a linear prediction filter (Step S5). In that case, the regression coefficient estimating unit 13 estimates the regression coefficient g(k) using Equations (13) to (15) given earlier. Subsequently, the inverse filter processing unit 14 performs inverse filter processing using the linear prediction filter estimated by the regression coefficient estimating unit 13 (Step S6). In that case, the inverse filter processing unit 14 performs inverse filter processing using Equation (4) based on the regression coefficient g(k), and obtains the reverberation removal signal d(n).

The repetitive control unit 15 determines whether or not the repeat count n has reached a predetermined count N, that is, determines whether or not n=N holds true (Step S7). If it is determined that n=N does not hold true (No at Step S7), then the repetitive control unit 15 increments the repeat count n by one (Step S8) and the system control returns to Step S4. That is, the repetitive control unit 15 inputs the reverberation removal signal d(n), which represents the output of the inverse filter processing unit 14, to the power estimating unit 12, and the operations in the repetitive loop from Step S4 to Step S6 are performed again.

On the other hand, if it is determined that n=N holds true (Yes at Step S7), then the repetitive control unit 15 outputs the result of the inverse filter processing performed by the inverse filter processing unit 14 as the reverberation removal signal d(n) (Step S9).

[Mathematical Background of Conventional Technology]

The following explanation is given about the mathematical background of the conventional technology. In the conventional signal processing device 10P (see FIG. 6), the observation feature quantity calculating unit 11P calculates the observation signal feature quantity from the observation signal, which is received as the input, as given earlier in Equation (1). The power spectrum estimating unit 12P calculates the power spectrum of the desired signal either by receiving, before the repetitive calculation is performed, input of the observation feature quantity obtained by conversion by the observation feature quantity calculating unit 11P or by receiving, after getting into a repetitive loop, input of the processing result obtained by the inverse filter processing unit 14P. After getting into a repetitive loop, the conventional power spectrum estimating unit 12P obtains the power spectrum of the desired signal using Equation (19) given below. Moreover, before the repetitive calculation is performed, the power spectrum of the desired signal is assumed to be the power spectrum of the observation signal, that is, assumed to be $|x_m(n, k)|^2$.

$$\hat{\lambda}(n,k) = |\hat{d}(n,k)|^2 \qquad (19)$$

Then, in the conventional signal processing device 10P, the regression coefficient estimating unit 13P estimates the regression coefficient based on the estimation result about the power spectrum of the desired signal and using Equations (13) to (15) given earlier; and the inverse filter processing unit 14P performs the inverse filter processing based on the estimated regression coefficient and using Equation (4) given earlier.

In the conventional signal processing device 10P, it is known that the operations are carried out in an effective manner when the observation sample count N is large, and generally the accuracy undergoes a decline when the observation signal length becomes short. That is, in the conventional signal processing device 10P, it is known that the accuracy undergoes a decline when the observation sample count N becomes smaller. That is because the conventional signal processing device 10P replaces the initial value of the dispersion value $\lambda(n, k)$ of the audio signal, which includes the direct sound and the initial reflected sound, with the power spectrum of the observation signal, that is, with $|x_m(n, k)|^2$.

Ideally, the dispersion value $\lambda(n, k)$ needs to be identical to the power spectrum of the audio signal that includes the direct sound and the initial reflected sound. However, in the conventional signal processing device 10P, since it is difficult to obtain that power spectrum, the power spectrum of the observation signal having poor approximation accuracy is instead used as the initial value.

In order to eliminate the impact of the low-accuracy initial value as much as possible, the conventional signal processing device 10P increases the averaging count (equivalent to N) for the purpose of calculation of the weighted covariance matrix R and the weighted correlation vector r given in Equations (14) and (15), and obtains the weighted covariance matrix R and the weighted correlation vector r that are close to the ideal values. Then, the signal processing device 10P uses Equation (13) as the result and estimates the regression coefficient with the accuracy maintained to a certain extent.

However, in the conventional signal processing device 10P, when the averaging count is small (i.e., when the value of N is small), the error included in $\lambda(n, k)$ directly affects the calculation of the weighted covariance matrix R and the weighted correlation vector r in Equations (14) and (15), and thus the regression coefficient g(k) having excellent accuracy cannot be obtained. In the conventional signal processing device 10P, when the regression coefficient g(k) having only poor accuracy can be obtained, even if the operation of estimating the regression coefficient and the inverse filter processing is performed in a repeated manner, the dispersion $\lambda(n, k)$ having excellent accuracy cannot be eventually obtained, and thus accurate reverberation suppression cannot be performed.

In contrast, in the present invention, as a result of estimating the feature quantity corresponding to the power of the observation signal using a neural network, it becomes possible to obtain a more accurate initial value of the feature quantity corresponding to the power as compared to the conventional case. As a result, the regression coefficient g(k) having a high accuracy can be estimated even with only a small averaging count.

[Evaluation Experiment]

An evaluation experiment was performed with the aim of evaluating the performance of the sound recognition operation according to the embodiment. In the evaluation experiment, a reverberant sound corpus REVERB was used. In REVERB, learning data containing various reverberations is provided. Hence, regarding the entire learning data, the observation signal feature quantity and the feature quantity of the corresponding desired signal (the sound including the direct sound and the initial reflected sound) were calculated in advance and were used as the learning dataset in optimizing the parameters of the neural network.

Meanwhile, the neural network can be of any form such as a totally-coupled neural network, a recurrent neural network, or a bidirectional recurrent neural network. Herein, a Long Short-Term Memory (LSTM) recurrent neural network was used. After optimizing the parameters of the learning data, the evaluation of the technique was performed using the test data of REVERB (containing different reverberations and utterers than the learning data). The test data is treated as the development set and the evaluation set of REVERB.

Moreover, in order to evaluate the manner in which the performance changes depending on the observation signal length (the value of N in Equations (14) and (15)), offline processing and online processing were studied. In the offline processing, it is assumed that all data of a single utterance can be used in processing, and the value of N corresponds to the utterance length of a single utterance.

On the other hand, in the online processing, all data of a single utterance cannot be used in the processing. Moreover, in the online processing, the data is read for two seconds at a time from the start of the utterance, and reverberation removal is performed after every two seconds. Hence, the value of N in Equations (14) and (15) becomes equal to two seconds, which is shorter than the utterance length of a single utterance. As a result, in the case of the online processing, the averaging count usable in Equations (14) and (15) becomes smaller, and thus it is expected that the performance in a conventional signal processing device undergoes a decline.

In Table 1 given below is illustrated the word error rates that were obtained as a result of performing reverberation removal using the signal processing device according to the present embodiment and the conventional signal processing device 10P, and then performing sound recognition using the post-reverberation-removal sounds.

TABLE 1

| Technique | Offline/Online | Development set | Evaluation set |
|---|---|---|---|
| Observation signal | | 23.4% | 26.2% |
| Conventional case | Offline | 20.3% | 19.1% |
| Present embodiment | Offline | 19.3% | 18.3% |
| Conventional case | Online | 21.3% | 19.9% |
| Present embodiment | Online | 19.2% | 18.4% |

As illustrated in Table 1, it can be understood that the signal processing device 10 according to the present embodiment enables achieving lower word error rates in the offline processing as well as the online processing as compared to the conventional signal processing device 10P.

[Effects of Embodiment]

As explained with reference to the result of the evaluation experiment, in the signal processing device 10 according to the present embodiment, the power spectrum of the desired signal is estimated using a neural network that enables spectrum estimation with accuracy. Hence, even when the observation signal is short, reverberation removal can be performed with accuracy.

In the present embodiment, although the explanation is given with reference to batch processing, that is not the only possible case. Alternatively, for example, as in the conventional case, the signal processing according to the present embodiment can be implemented after every frame of a predetermined period of time (for example, 10 msec).

Moreover, the signal processing according to the present embodiment can be implemented also in areas not subjected to Fourier transform (for example, in subband areas).

[Regarding System Configuration of Embodiment]

The constituent elements of the signal processing device 10 illustrated in FIG. 1 are merely conceptual, and need not be physically configured as illustrated. Moreover, the constituent elements of the signal processing device 10, as a whole or in part, can be separated or integrated either functionally or physically based on various types of loads or use conditions.

The process functions performed by the signal processing device 10 are entirely or partially implemented by a CPU or by computer programs that are analyzed and executed by the CPU, or implemented as hardware by wired logic.

Of the processes described in the embodiment, all or part of the processes explained as being performed automatically can be performed manually. Similarly, all or part of the processes explained as being performed manually can be performed automatically by a known method. The processing procedures, the control procedures, specific names, various data, and information including parameters described in the embodiment or illustrated in the drawings can be changed as required unless otherwise specified.

[Program]

Figure 5:
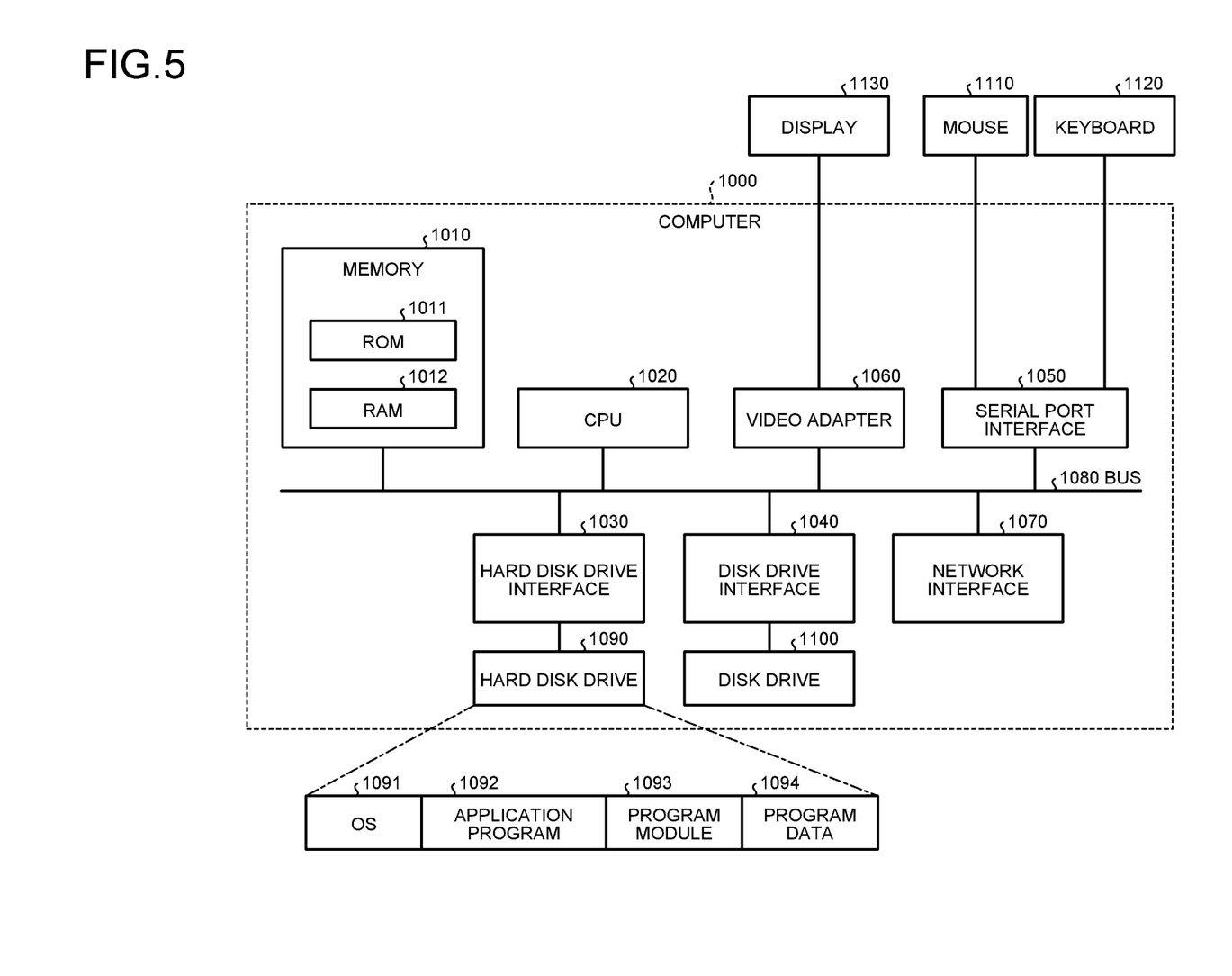
FIG. 5 is a diagram illustrating an exemplary computer in which the signal processing device is implemented as a result of execution of a program.

FIG. 5 is a diagram illustrating an exemplary computer in which the signal processing device 10 is implemented as a result of execution of a program. For example, a computer 1000 includes a memory 1010 and a CPU 1020. Moreover, the computer 1000 includes a hard disk drive interface 1030, a disk drive interface 1040, a serial port interface 1050, a video adapter 1060, and a network interface 1070. These constituent elements are connected to each other by a bus 1080.

The memory 1010 includes a ROM 1011 and a RAM 1012. The ROM 1011 is used to store, for example, a boot program such as the BIOS (Basic Input Output System). The hard disk drive interface 1030 is connected to a hard disk drive 1090. The disk drive interface 1040 is connected to a disk drive 1100. For example, a detachably-attachable memory medium such as a magnetic disk or an optical disk is inserted in the disk drive 1100. The serial port interface 1050 is connected to, for example, a mouse 1110 and a keyboard 1120. The video adapter 1060 is connected to, for example, a display 1130.

The hard disk drive 1090 is used to store, for example, an OS 1091, an application program 1092, a program module 1093, and program data 1094. That is, the program that defines the operations of the signal processing device 10 is installed as the program module 1093 having the code executable by the computer 1000 written therein. The program module 1093 is stored in, for example, the hard disk drive 1090. For example, the program module 1093 that is meant for performing identical operations to the functional configuration of the signal processing device 10 is stored in the hard disk drive 1090. Meanwhile, the hard disk drive 1090 can be replaced by an SSD (Solid State Drive).

The setting data that is used in the operations according to the embodiment is stored as the program data 1094 in, for example, the memory 1010 or the hard disk drive 1090. Then, the CPU 1020 reads the program module 1093 and the program data 1094, which are stored in the memory 1010 or the hard disk drive 1090, as may be necessary, into the RAM 1012; and executes the program.

Meanwhile, the program module 1093 and the program data 1094 need not always be stored in the hard disk drive 1090, and can alternatively be stored in, for example, a detachably-attachable memory medium, and can be read by the CPU 1020 via the disk drive 1100. Still alternatively, the program module 1093 and the program data 1094 can be stored in some other computer connected via a network (such as a LAN or a WAN). Then, the CPU 1020 can read the program module 1093 and the program data 1094 from the other computer via the network interface 1070.

Herein, although the description is given about the embodiment of the invention made by the inventor(s), the technical scope of the present invention is not limited to the embodiment described above, and can be construed as embodying various deletions, alternative constructions, and modifications that may occur to one skilled in the art that fairly fall within the basic teaching herein set forth.

REFERENCE SIGNS LIST 10, 10A, 10P signal processing device
11, 11P observation feature quantity calculating unit power estimating unit
12P power spectrum estimating unit
13, 13P regression coefficient estimating unit
14, 14P inverse filter processing unit
15, 15P repetitive control unit
20 cost calculating unit

The invention claimed is:

1. A neural network based signal processing device that, from observation signal which is measured with one or more microphones and which includes reverberation, estimates signal having reduced reverberation, the signal processing device comprising:
a memory; and
a processor coupled to the memory and programmed to execute a process comprising:
first estimating
treats feature quantity of signal including reverberation as input,
inputs observation feature quantity corresponding to the observation signal to a neural network which is learnt in such a way that estimate value of feature quantity corresponding to power of signal having reduced reverberation, from among the input signal, is output, and
estimates estimate value of feature quantity corresponding to power of the signal having reduced reverberation and corresponding to the observation signal; and
second estimating
uses estimate value of feature quantity corresponding to power as obtained as estimation result in the first estimating, and
estimates regression coefficient of autoregressive process for generating the observation signal.

2. The neural network based signal processing device according to claim 1, wherein the second estimating estimates, as the regression coefficient, filter coefficient of a linear prediction filter in which prediction residual follows time-varying probability distribution having average of 0 and having dispersion to be power of desired signal.

3. The neural network based signal processing device according to claim 1, wherein the second estimating estimates, as the regression coefficient, filter coefficient of a linear prediction filter in which prediction residual follows Gaussian distribution having average of 0 and having dispersion to be power of desired signal.

4. The neural network based signal processing device according to claim 2, wherein the process further comprises an inverse filtering with respect to observation feature quantity using the linear prediction filter.

5. The neural network based signal processing device according to claim 4, wherein the process further comprises controlling for repeating, for required number of times,
an operation of estimating power of desired signal as performed in the first estimating,
an operation of estimating a linear prediction filter as performed in the second estimating, and
the inverse filter processing as performed in the inverse filter processing.

6. The neural network based signal processing device according to any one of claims 1, wherein
the neural network in the first estimating is a recurrent neural network, and
the neural network has a layer for taking square of absolute value of input value of the neural network and converting the square into a real value.

7. A neural network based signal processing method that is implemented by a signal processing device which, from observation signal that is measured with one or more microphones and that includes reverberation, estimates signal having reduced reverberation, the signal processing method comprising:
a first estimating step that includes
treating feature quantity of signal including reverberation as input,
inputting observation feature quantity corresponding to the observation signal to a neural network which is learnt in such a way that estimate value of feature quantity corresponding to power of signal having reduced reverberation, from among the input signal, is output, and
estimating estimate value of feature quantity corresponding to power of the signal having reduced reverberation and corresponding to the observation signal; and
a second estimating step that includes
using estimate value of feature quantity corresponding to power as obtained as estimation result at the first estimating step, and
estimating regression coefficient of autoregressive process for generating the observation signal.

8. A non-transitory, computer-readable recording medium having stored therein a neural network based signal processing program for causing a computer to execute a process comprising:
a first estimating step that includes
treating feature quantity of signal including reverberation as input,
inputting observation feature quantity corresponding to observation signal that is measured with one or more microphones and that includes reverberation to a neural network which is learnt in such a way that estimate value of feature quantity corresponding to power of signal having reduced reverberation, from among the input signal, is output, and
estimating estimate value of feature quantity corresponding to power of the signal having reduced reverberation and corresponding to the observation signal; and
a second estimating step that includes
using estimate value of feature quantity corresponding to power as obtained as estimation result at the first estimating step, and
estimating regression coefficient of autoregressive process for generating the observation signal.

9. The neural network based signal processing device according to claim 3, wherein the process further comprises an inverse filtering with respect to observation feature quantity using the linear prediction filter.

10. The non-transitory, computer-readable recording medium according to claim 8, wherein the process further comprises:
controlling for repeating, for required number of times,
an operation of estimating power of desired signal as performed in the first estimating,
an operation of estimating a linear prediction filter as performed in the second estimating, and
the inverse filter processing as performed in the inverse filter processing.

* * * * *